Patented Mar. 9, 1943

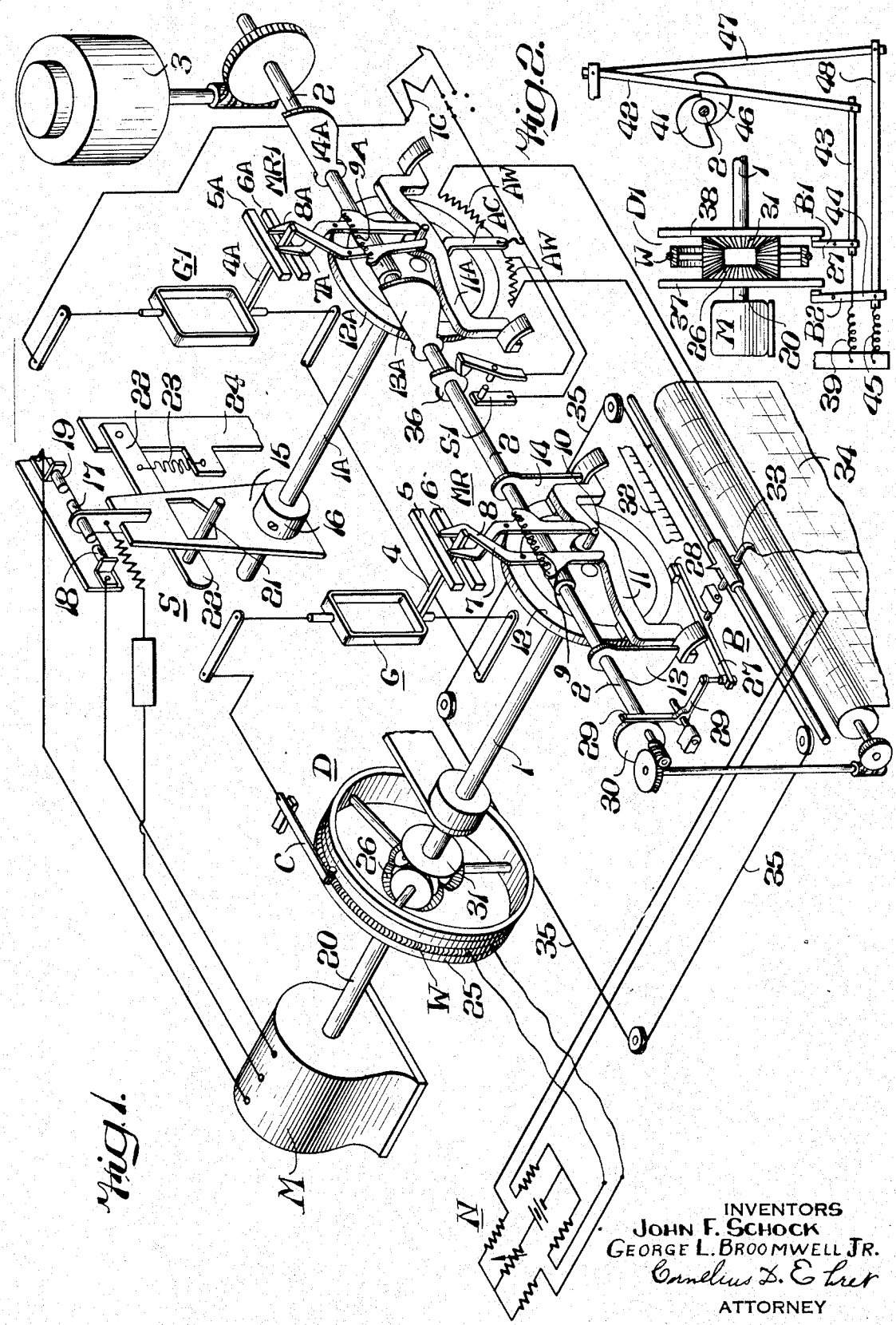

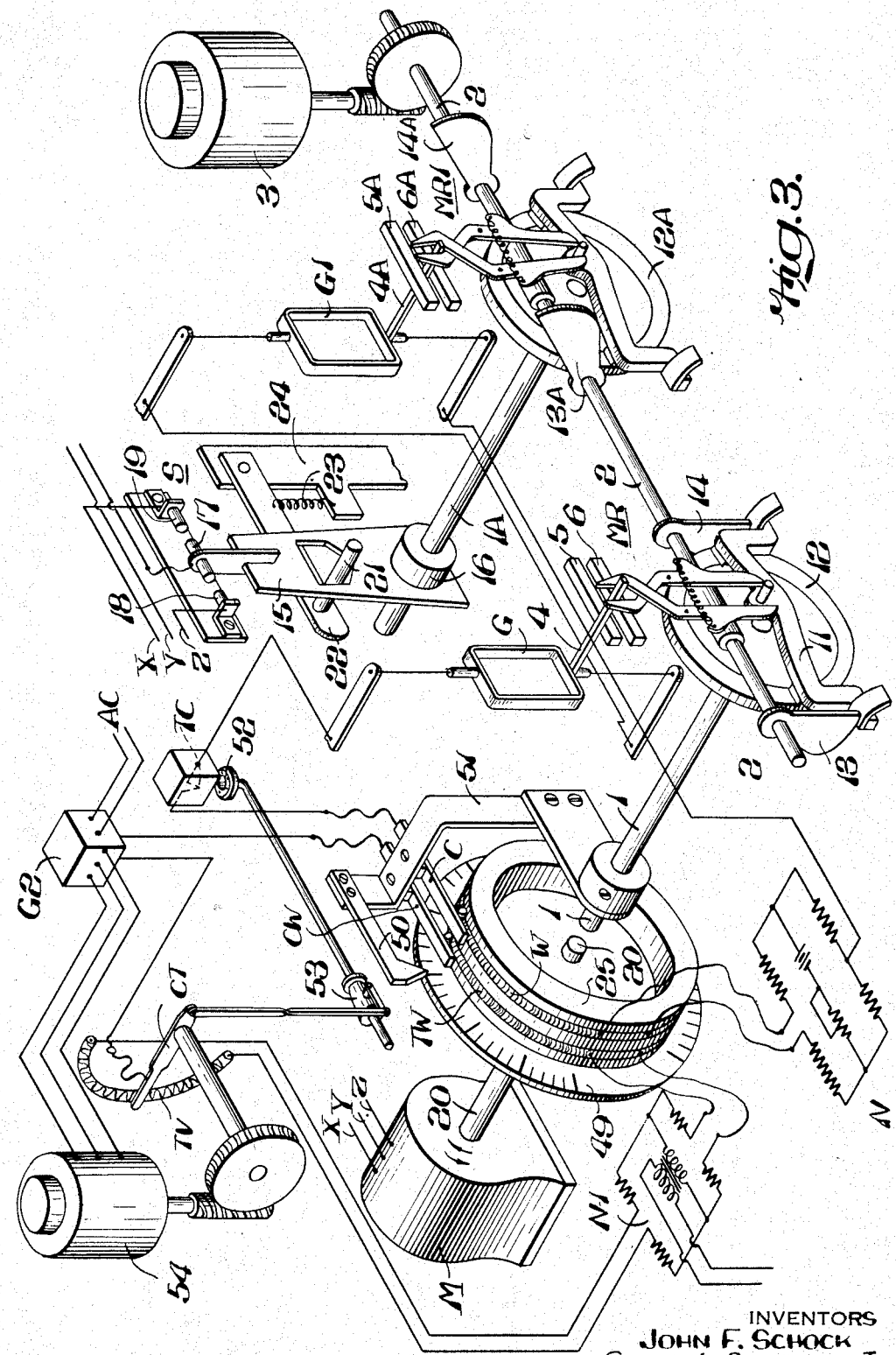

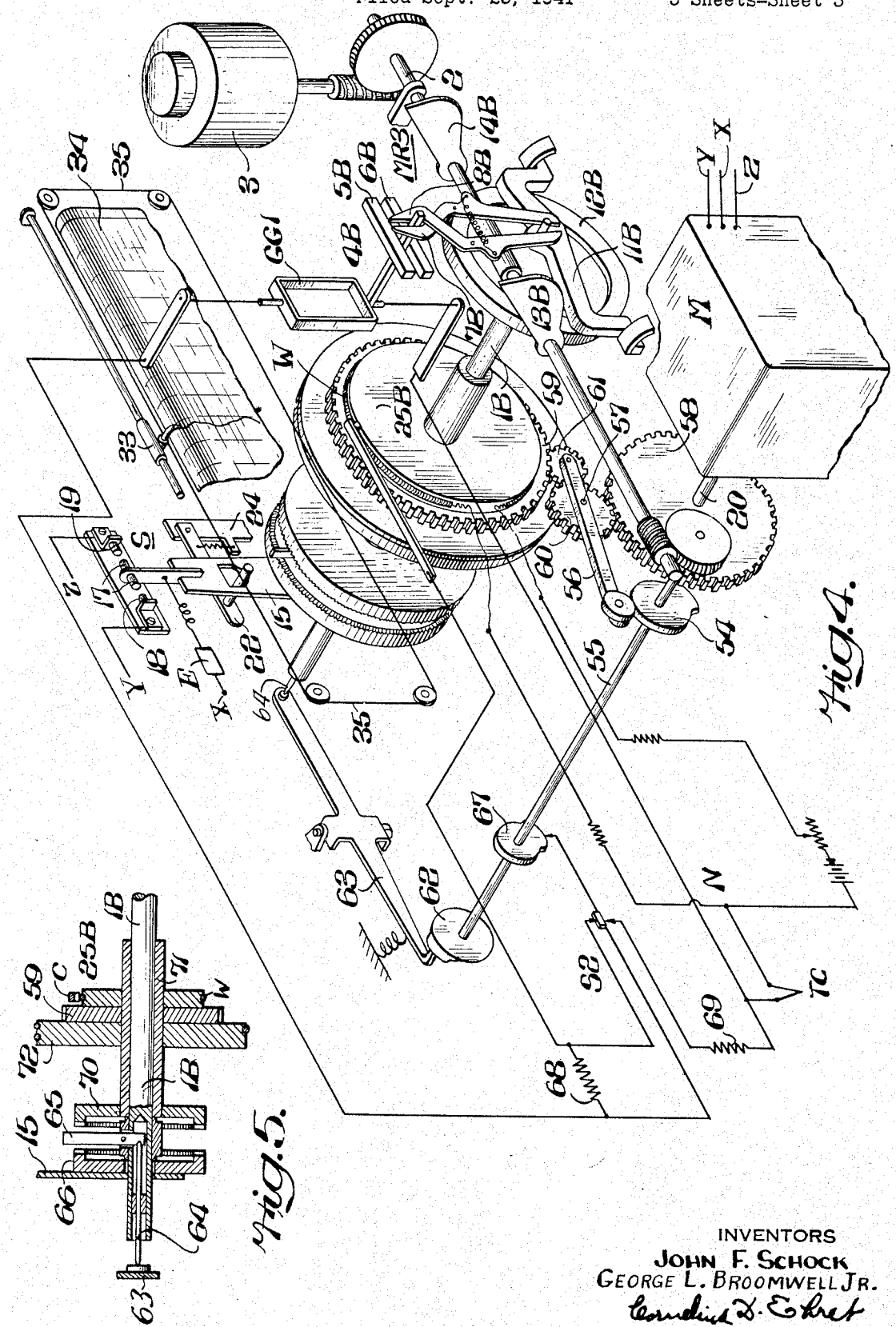

2,313,272

UNITED STATES PATENT OFFICE 2,313,272

SELF-BALANCING SYSTEM

John F. Schock, Philadelphia, and George L. Broomell, Jr., Springfield Township, Montgomery County, Pa., assignors to Leeds & Northrup Company, Philadelphia, Pa., a corporation of Pennsylvania Application September 23, 1941, Serial No. 412,000

8 Claims. (Cl. 171—95)

Our invention relates to self-balancing systems in which relatively weak or small electrical effects, such as the unbalanced current of a network such as a Wheatstone bridge or a potentiometer, are utilized to control movement of relatively heavy or massive devices to restore balance and concurrently to perform, for example, one or more of the functions of indicating, recording, or controlling the magnitude of a condition, such as temperature, pressure, flow, ion concentration, or other physical, electrical or chemical condition, or the position of an element movable in response to, or to effect, changes in magnitude of a condition.

In accordance with our invention, the rebalancing is effected by successively operating arrangements of substantially different sensitivities to aforesaid weak effects and having substantially different speeds of operation; more particularly, one arrangement having low sensitivity rapidly reduces the unbalance to within narrow limits within which the other arrangement having a higher sensitivity then operates more slowly to effect precise balance.

In some forms of our invention, the rapid but coarse rebalancing operation is effected by a motor under the control of a galvanometer of low sensitivity, and the precise balancing operation is performed in one or more steps by a mechanical relay under the control of a galvanometer of high sensitivity; in another form of our invention, the motor and mechanical relay are successively subject to control by a single galvanometer the sensitivity of which, for control periods of the motor and mechanical relay respectively, is recurrently decreased and increased.

Further in accordance with our invention, in order that the more sensitive galvanometer may respond during the coarse rebalancing adjustment of the slide wire or equivalent as if that coarse adjustment had been completed, there is provided an auxiliary slide wire or equivalent means set by and in accordance with deflection of the less sensitive galvanometer temporarily to inject into the measuring network a voltage of magnitude proportional to the extent of that deflection.

Our invention further resides in systems having the features of operation, construction and combination hereinafter described and claimed.

For an understanding of our invention and for illustration of various forms thereof, reference is made to the attached drawings in which:

Fig. 1, in perspective, shows significant elements of recorder mechanism and includes a wiring diagram of its connections;

Fig. 2 illustrates a modification of brake mechanism shown in Fig. 1;

Fig. 3, in perspective, shows significant elements of a modified form of the apparatus shown in Fig. 1, and includes a wiring diagram of connections adapting it for use in a temperature control system;

Fig. 4, in perspective, discloses another modification of our invention using a single galvanometer;

Fig. 5 is a sectional view showing details of construction of parts of the apparatus shown in Fig. 4.

Referring to Fig. 1, the mechanical relay MR for effecting angular adjustment of shaft 1 in response to deflection of galvanometer G, is generally of the type disclosed in Squibb Patent #1,935,732 to which reference is made for more complete description of its construction and mode of operation. In brief, for each revolution of shaft 2 driven continuously as by motor 3, the pointer 4 of galvanometer G is clamped between the bars 5 and 6 at least one of which is controlled by cam structure, not shown, rotating with shaft 2. While the pointer 4 is so clamped, the feelers 7, 8 are released by another cam structure rotating with shaft 2, for movement, as by spring 9, toward one another for engagement with opposite sides of the clamped pointer.

Unless the pointer 4 when clamped is in its central or null position, the lower end of one or the other of the feelers 7, 8 during their aforesaid movement into engagement with the pointer engages pin 10 extending from the clutch arm 11 and swings it thru an angle which is the greater the greater the deflection of the galvanometer pointer from null position. The direction in which the clutch arm 11 is moved by one or the other of the feelers depends upon the sense of deflection of the galvanometer pointer.

After clutch arm 11 has been so set, another cam on shaft 2 permits the arm 11 to be moved, as by a biasing spring, into engagement with the clutch disc 12 attached to shaft 1; as shaft 2 continues to rotate, one or the other of the restoring cams 13, 14 engages the clutch arm 11 and returns it to its neutral position shown in Fig. 1. Clutch members 11, 12 being in engagement during the restoring action the shaft 1 is moved in accordance with the sense and extent of deflection of the galvanometer pointer to effect rebalancing adjustment of slidewire W with respect to its contact C.

In like manner, shaft 1A is intermittently adjusted in a direction and to an extent proportional to the deflection of galvanometer G1 thru a second mechanical relay mechanism MR1 similar to mechanical relay MR previously described.

The switch S for effecting intermittent rotation of motor M in a direction corresponding with the sense of deflection of pointer 4A of galvanometer G1 and for periods proportional to the extent of deflection of pointer 4A comprises plate 15 loosely mounted on shaft 1A and in engagement with the friction driving member 16 attached to shaft 1A. The movable contact 17 of switch S is carried by plate 15 for engagement with one or the other of the fixed contacts 18, 19 so to effect rotation of shaft 20 of motor M in one direction when contacts 17 and 19 are in engagement and in reverse direction when contacts 17 and 18 are in engagement. The separation between the contacts is relatively small so that for more than slight angular adjustment of shaft 1A, there is substantially immediately effected engagement of contact 17 with one or the other of contacts 18, 19. This contact engagement persists throughout each movement of clutch member 11A by one or the other of the restoring cams 13A, 14A, the torque exerted by the friction member 16 maintaining the contacts in engagement during such movement of shaft 1A.

The plate 15, and with it contact 17, is returned in each cycle of the apparatus (each revolution of shaft 2), to the central or open-circuit position shown in Fig. 1, by any suitable centering device. In the particular centering arrangement shown, pin 21 extending from arm 22 is disposed within a V-shaped notch in plate 15 and spring 23 connected between arm 22 and frame member 24 biases the pin 21 to the bottom of the notch so that when, during a cycle, plate 15 is displaced by movement of shaft 1A, the spring 23 is tensioned to restore contact 17 to open circuit position when shaft 1A, subsequently in the cycle, is released from clutch member 11A.

The rebalancing movements of shaft 20 are transmitted to the form 25 upon which is disposed slidewire resistance W thru the differential D including gear 26 attached to motor shaft 20.

During the portion of each revolution of shaft 2 allotted to operation of motor M, shaft 1 is restrained from possible movement with any element of differential D by a suitable brake B, which as shown in Fig. 1, may comprise a pivotally mounted arm 27, one end of which carries the brake shoe 28 and the other end of which is suitably coupled to its operating member 29 biased into engagement with cam 30 on shaft 2. The shape of cam 30 and its angular disposition on shaft 2 is such that the brake shoe 28 engages the periphery of clutch member 12 throughout that part of each cycle in which there may occur adjustment of slide wire form 25 by motor M. The brake B is released, however, during the alternate portion of each cycle during which there may be adjustment of the slidewire form 25 by shaft 1 under the control of galvanometer G thru mechanical relay MR, shaft 1, and differential gear 31 on shaft 1.

It shall be understood the groups of cams respectively controlling the various components of the mechanical relays MR, MR1, are so disposed that adjustable slide wire W is alternately subject, in each cycle of the apparatus, to actuation by motor M and mechanical relay MR. Furthermore, to avoid influence of generator action incident to movement of either galvanometer coil upon the deflection of the pointer of the other galvanometer, the cams which control the pairs of clamping bars 5, 6, 5A, 6A are so timed that pointer 4 is free to deflect only when pointer 4A is clamped, and vice versa.

Movement of form 25 may be utilized not only to effect rebalancing adjustment of slidewire W, but in addition may be used to position an indicating member with respect to scale 32 or to move the stylus 33, or equivalent marker, with respect to recorder sheet 34; to that end, the cord 35 attached to the indicating or marking element is suitably connected or coupled to form 25, or some other suitable element rotatable therewith. Movement of form 25, or any element movable therewith, may also or alternatively be used to adjust a valve, rheostat or other control element in response to deflections of the galvanometers.

Though not restricted to such application, the apparatus is shown in Fig. 1 as used in a potentiometer system including thermo-couple TC for measurement of temperature. When the electromotive force developed by the thermo-couple is equal to an effective potentiometer voltage corresponding with the relative positions of slidewire W and its contact C, there is no deflection of either galvanometer G or G1 and consequently there is no actuation of the slidewire W by either of its operating arrangements.

Assuming there occurs a slight change in temperature, for example, a change in degrees corresponding with less than about 5% or 10% of the range of the instrument, galvanometer G1 is too insensitive to effect sufficiently large movement of contact 17 to cause operation of motor M and adjustment of slidewire W but the more sensitive galvanometer G responds to the small unbalance current and thru the mechanical relay MR, including restoring cams 13 and 14, effects adjustment of slide wire W on form 25 in one or more successive cycles until the thermocouple voltage is precisely balanced.

Under the assumed circumstance of small unbalance of the potentiometer system, adjustment of the slide wire W by motor M would be undesirable because the speed of adjustment by motor M is so high that the adjustment effected in a cycle would cause overshooting of the balance point.

For large unbalances of the measuring system, the arrangement comprising insensitive galvanometer G1, mechanical relay MR1, and switch S affords rapid rebalancing adjustment of slide wire W which is proportional to the extent of unbalance as measured in each cycle. The sensitivity of the galvanometer G1 and the spacing of the contacts of switch S are so chosen or adjusted that motor M by its adjustment of slide wire W rapidly, preferably within a single cycle of the instrument, reduces the unbalance to within a few percent of the balance point; i. e. between narrow limits, within which the high-sensitivity low-speed arrangement comprising galvanometer G and mechanical relay MR subsequently effects a precise rebalancing adjustment of the slidewire by one or more steps. In event of sudden large change in temperature while pointer 4 is free to deflect, the pointer moves to the limit of its movement to the right or left in dependence upon whether the change is an increase or decrease, with the result there is subsequently effected maximum rebalancing adjustment, of slidewire W, of which the high-sensitivity control combination is capable. Before pointer 4 is again free to deflect, motor M, under control of the less-sensitive control combination including galvanometer G1, cumulatively acts further to reduce the unbalance of network N. When such unbalance is sufficiently reduced, completion of the rebalancing is effected alone by the high-sensitivity control combination; the low-sensitivity control combination, including G1, MR1 remains inactive. Until the unbalance of the network N is to aforesaid extent reduced, both control combinations act successively cumulatively to reduce the unbalance by alternately occurring large and small increments. By the joint action of the two arrangements, the position of the indicating marking element closely follows even rapid changes in the temperature or other condition under measurement, and without over-shooting or hunting.

By way of example, the driving means for shaft 2 may be selected to effect one revolution thereof in each two seconds so to afford in each minute as many as 30 high-speed coarse adjustments of slidewire W by motor M and as many as 30 low-speed highly precise adjustments of the slidewire by the mechanical relay MR. Also and further by way of example, the motor M and its connections to the differential D are preferably so selected that the slide wire may be moved from any position within its range of adjustment to within about 5% of any other position within that range during one revolution of shaft 2 or cycle of the instrument. As illustrative of the relative sensitivities of the galvanometers G and G1, the former may have a sensitivity of the order of nine times that of the latter.

Still further to shorten the time required for eventual rebalancing, by avoiding need to wait until the coarse rebalancing step effected by motor M is completed before permitting response of the sensitive galvanometer G, there is provided the auxiliary slidewire AW, contact AC therefor, and switch S1 connected between contact AC and the mid-point or other suitable point of reference potential on the auxiliary slidewire AW. The angular extent of the central portion of the auxiliary slidewire, which portion is of negligible resistance, substantially corresponds with the angular extent of the range of movement of contact 17 between the two fixed contacts 18, 19.

During setting of clutch member 11A by feeler 7A or 8A, the contact AC, because carried by member 11A then away from disc 12A, is out of engagement with the slidewire AW and one terminal of the thermo-couple TC is connected to the point of reference potential by the switch S1 then closed. When however clutch member 11A is in engagement with the clutch disc 12A and particularly during its return to neutral position by the restoring cams, contact AC is in engagement with the auxiliary slidewire and switch S1 under the control of cam 36 is then open.

In consequence, the unbalance of the measuring circuit N to which sensitive galvanometer G responds initially in each cycle corresponds not with an unbalance solely related to the change of temperature but to an unbalance differing therefrom by an amount also proportional to the angular displacement of contact AC from its central position and therefore proportional to the adjustment to be or being effected in that cycle by motor M in response to deflection of insensitive galvanometer G1.

In the arrangement shown in Fig. 1, brake B is provided, as above stated, to prevent rotation of shaft 1 when motor shaft 20 may be in operation, but there is no brake provided to prevent operation of shaft 20 when shaft 1 is operated. In most cases this is not necessary because the friction inherent in the motor provides sufficient braking. However, as shown in Fig. 2 there may be provided a braking arrangement which alternately holds shafts 1 and 20 during rotation of the other of them. More particularly, the differential D' is provided with brake discs 37 and 38 attached respectively to shafts 20 and 1; the brake B1 for precluding movement of shaft 1 comprises the pivoted arm 27 biased by spring 39 into engagement with brake disc 38 for a portion of the cycle determined by cam 41 on shaft 2. Brake B1 is released by the operating linkage including lever 42 engaged by cam 41 and a link 43 connecting the levers 42 and 27.

Similarly brake B2 for precluding movement of shaft 20 comprises pivoted arm 44 biased by spring 45 into engagement with the other brake disc 37 for a portion of the cycle determined by cam 46 on shaft 2. The operating linkage for brake B2 includes the lever 47 engaged by cam 46 and link 48 which connects the levers 47 and 44.

The cams 41 and 46 are so angularly disposed that the brakes B1 and B2 are alternately set and released, brake B1 precluding movement of shaft 1 by rotation of shaft 20 and brake B2 precluding movement of shaft 20 when brake B1 is released for adjustment of the slidewire W by shaft 1.

The system shown in Figure 3 is similar to that of Fig. 1 in that rapid coarse rebalancing adjustment of slidewire W is effected by motor M under control of reversing switch S intermittently operated by a mechanical relay mechanism MR1 in response to deflections of a relatively insensitive galvanometer G1; it is also similar to the system of Fig. 1 in that precise rebalancing adjustment of slidewire W is effected by a second mechanical relay mechanism MR under the control of a relatively sensitive galvanometer G. Instead, however, of utilizing a differential D as in Fig. 1 to provide for adjustment of resistance W by aforesaid pair of operating arrangements, in the apparatus shown in Fig. 3 the form 25 which carries the slidewire W is mounted on one of the shafts 20 and 1, and the slidewire contact C is carried by, or movable with, the other of shafts 20 and 1. In effect in the modification shown in Fig. 3, there is substituted for the mechanical differential D of Fig. 1 an electrical differential equivalent thereto in the rebalancing of network N under control of the galvanometers G and G1.

For indicating the magnitude of temperature or other condition under measurement, scale 49 may be attached to one of the relatively movable members—slidewire W and its contact C—and the pointer 50 may be attached to the other of those members; in the particular arrangement shown, scale 49 rotates with form 25 and index 50 therefor is attached to the supporting bracket 51 of contact C.

In the system of Fig. 3, there is also provision for controlling the condition under measurement to maintain it of substantially constant magnitude; more particularly, the condition responsive element, thermo-couple TC, responds to changes in magnitude of a temperature more or less directly determined by the burner 52 to which the supply of fuel is varied by valve 53 or equivalent. The reversible motor 54 for operating valve 53 is controlled by a contacting-galvanometer device G2, or equivalent, responsive to unbalance of a second network NI, which may, as shown, be of Wheatstone bridge type, including slidewires TW and TV. The adjustable contact CT of slidewire TV is operable concurrently with valve 53 by motor 54, its position with respect to slidewire TV corresponding with the position of the adjustable element of valve 53. Slidewire TW is mounted upon form 25 for adjustment with slidewire W of the measuring network N and contact CW of slidewire TW is mounted upon bracket 51 for adjustment concurrently with contact C of slidewire W.

Accordingly when motor M operates under the control of insensitive galvanometer GI rapidly to effect, as previously described, a balancing adjustment of slidewire W of network N there is concurrently effected a rapid unbalancing adjustment of slidewire TW of the control network NI whereupon motor 54 operates under control of G2 to adjust valve 53 in a sense suited by its control of fuel to the burner to restore to original or predetermined magnitude the temperature to which thermo-couple TC is responsive; and when galvanometer G through relay mechanism MR effects precise slower balancing adjustment of slidewire W of network N, there is concurrently effected a slow unbalancing adjustment of slidewire TW so to effect a supplemental and nicer control of the valve 53.

In the modification of our invention shown in Figs. 4 and 5, a single galvanometer in association with a single mechanical relay mechanism, is used alternately to effect rapid adjustment of slidewire W by motor M and more precise adjustment thru mechanical relay mechanism. In brief the single galvanometer GGI and the single mechanical relay MR3 of Fig. 4 for a chosen number of revolutions of shaft 2 serve the purpose of galvanometer GI and relay mechanism MRI of Figs. 1 and 3 and for a succeeding chosen number of revolutions of shaft 2 the galvanometer GGI and MR3 of Fig. 4 serves the function of galvanometer G and mechanical relay MR of Figs. 1 and 3. For that part of the cycle of the instrument for which the galvanometer deflection determines the duration of energization of motor M, the galvanometer sensitivity is suitably reduced as by series resistance or shunt resistance, or both.

Referring to Figs. 4 and 5, the cam 54 on shaft 55 periodically rocks arm 56 on its pivot 57 to effect driving connection from gear 58 on shaft 20 to gear 59 rotatable with the slidewire form 25B thru the reduction gearing comprising gear 60, rotatable about pivotal axis 57 of arm 56 and continuously enmeshed with gear 58, and gear 61, continuously enmeshed with gear 60 and movable into and out of engagement with gear 59 in accordance with the position of supporting arm 56.

For that recurrent period for which there is established this driving connection between motor M and slidewire W, the cam 62 on shaft 55 is effective, thru the lever 63, pin 64 and clutch member 65, to couple the shaft IB to the driven clutch member 66 in frictional engagement with plate 15 of reversing switch S of motor M. During this same period, the cam 67 so positions contact elements of the sensitivity-control switch S2 that the resistance 68 is connected effectively in shunt to the galvanometer coil and resistance 69 is connected effectively in series with the galvanometer to reduce its sensitivity to suitably desired extent for the rapid coarse adjustment of slidewire W by motor M under control of switch S. As in the other modifications, the periods of intermittent energization of motor M are of duration proportional to the deflections of a low sensitivity galvanometer.

For the alternate intermittent periods during which cam 54 effects decoupling of motor M from the slidewire form 25B, arm 63 under control of cam 62 is in its outer position and so effects coupling of shaft IB to the driven clutch member 70 thru the driving clutch member 65. The driving clutch member 70 is secured to the sleeve 71, or equivalent member, to which the gear 59, slidewire form 25B and the pulley 72, are attached. During this same time, switch S2, under the control of cam 67, opens the circuit including resistor 68 in shunt to the galvanometer coil and short-circuits the series resistor 69 thus converting the galvanometer to one of high sensitivity. During this portion of the cycle of the instrument, the mechanical relay MR3 responds to a galvanometer having high sensitivity directly mechanically to effect, thru the clutch 65, 70, precise adjustment of the slidewire W of the measuring network N.

By suitably coupling the slidewire form 25B to an indicating or recording element 33, the system may be used to indicate or record the changes in magnitude of a condition for example, temperature, the changes of which effect temporary unbalance of network N restored to balance by adjustment of slidewire W. In the arrangement shown, the movements of the slidewire W are transmitted to the indicating or recording element 33 by cord 35 which passes around or is attached to pulley 72. By addition of another slidewire, as in Fig. 3, or by addition of control elements such as control switch contacts, the self-balancing apparatus of Fig. 5 may alternatively, or in addition, be used to effect control of temperature, or other condition, in response to unbalance of network N.

Altho for simplicity each of the modifications described illustrates a so-called "single point" instrument, it is to be understood that by addition of suitable selector switch, disclosed for example in Ross et al. Patent 2,113,069, it may be converted into multi-point instrument and in such case it should be understood that while each selected condition responsive element is connected to the measuring network the self-balancing instrument completes at least one of its cycles providing both rapid approximate balancing adjustment of slidewire W and an immediately following slower precise adjustment of slidewire W.

For brevity, in the appended claims, it shall be understood the term "mechanical relay" is employed in its usual sense to define an arrangement in which a deflecting member such as the pointer of a galvanometer, or other responsive device, is intermittently clamped mechanically to control the extent to which a relatively powerful source moves a controlled member.

What we claim is:

1. A self-balancing system comprising means for producing an effect representative of unbalance of said system, structure adjustable to rebalance said system, and means for adjusting said structure comprising devices responsive to said effect and operative intermittently and alternately to check said system for unbalance thereof, one of said devices having relatively low sensitivity for effecting in response to unbalance of said system rapid coarse adjustment of said structure and the other of said devices having relatively higher sensitivity to said effect for effecting a slower precise adjustment of said structure.

2. A self-balancing system comprising means for producing an effect representative of unbalance of said system, structure adjustable to rebalance said system, and a plurality of sequentially operative means for effecting adjustment of said structure intermittently and non-concurrently operative to respond to unbalance of said system, one of said means comprising a motor and a control device therefor having low sensitivity to said effect and another of said means comprising a mechanical relay and a control device therefor having relatively high sensitivity to said effect.

3. A self-balancing system comprising means for producing an effect representative of unbalance of said system, structure adjustable to rebalance said system, and devices for effecting adjustment of said structure intermittently and non-currently operative to respond to unbalance of said system, one of said devices comprising a motor and control means therefor and the other of said devices comprising a mechanical relay and control means therefor independent of and having substantially higher sensitivity to said effect than said first named control means.

4. A self-balancing system comprising means for producing an electric current representative of unbalance of said system, an impedance adjustable to rebalance said system, a motor for effecting adjustment of said impedance, a mechanical relay for effecting adjustment of said impedance, and galvanometer means for effecting successively control of said motor and of said relay, said galvanometer means having predetermined sensitivity to said current for control of said motor and higher sensitivity to said current for control of said relay.

5. A self-balancing system comprising means for producing an electric current representative of unbalance of said system, an impedance adjustable to rebalance said system, a first galvanometer of predetermined sensitivity responsive to said current, a motor for effecting rapid adjustment of said impedance in accordance with deflection of said galvanometer, a second galvanometer of sensitivity higher than said first named galvanometer, responsive to said current, and a mechanical relay for effecting precise adjustment of said impedance in accordance with deflection of said second galvanometer.

6. A self-balancing system comprising means for producing an electric current representative of unbalance of said system, an impedance adjustable to rebalance said system, a motor for rapidly effecting rebalancing adjustment of said impedance, means for effecting intermittent energization of said motor for periods varying in duration as a function of the magnitude of said current, and means for effecting slower precise rebalancing adjustment of said impedance comprising a mechanical relay and a galvanometer responsive to said current.

7. A self-balancing system comprising means for producing an electric current of polarity and magnitude corresponding with the sense and extent of unbalance of said system, an impedance adjustable to rebalance said system, a reversible motor for rapidly effecting coarse rebalancing adjustment of said impedance, control means for said motor comprising a reversing switch, galvanometer means of predetermined sensitivity to said current, mechanical relay mechanism controlled by said galvanometer means intermittently to effect closure of said switch in sense corresponding with sense of deflection of said galvanometer and for a period substantially proportional to the magnitude of said deflection, and means for slowly effecting precise rebalancing adjustment of said impedance comprising galvanometer means of higher sensitivity to said current, and mechanical relay mechanism controlled thereby.

8. A self-balancing system comprising means for producing an electric current of polarity and magnitude corresponding with the sense and extent of unbalance of said system, an impedance adjustable to rebalance said system, a pair of galvanometers of different sensitivities connected in series, means operable intermittently alternately to release the deflectable elements of said galvanometers, a motor intermittently controlled in response to deflections of the galvanometer of lower sensitivity rapidly to effect coarse rebalancing adjustment of said impedance, and a mechanical relay controlled intermittently in response to deflections of the galvanometer of higher sensitivity slowly to effect precise rebalancing adjustment of said impedance.

JOHN F. SCHOCK.
GEORGE L. BROOMELL.